(12) United States Patent
Dashora et al.

(10) Patent No.: US 12,099,844 B1
(45) Date of Patent: Sep. 24, 2024

(54) DYNAMIC ALLOCATION OF PATTERN HISTORY TABLE (PHT) FOR MULTI-THREADED BRANCH PREDICTORS

(71) Applicant: Ceremorphic, Inc., San Jose, CA (US)

(72) Inventors: Somya Dashora, Rajasthan (IN); Kalash Bhavin Shah, Maharashtra (IN); Prakhar Kumar, Uttar Pradesh (IN)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 17/827,909

(22) Filed: May 30, 2022

(51) Int. Cl.
*G06F 9/30* (2018.01)
*G06F 9/38* (2018.01)

(52) U.S. Cl.
CPC .......... *G06F 9/3806* (2013.01); *G06F 9/3844* (2013.01); *G06F 9/3851* (2013.01)

(58) Field of Classification Search
CPC ..... G06F 9/3806; G06F 9/3844; G06F 9/3851
See application file for complete search history.

(56) References Cited

U.S. PATENT DOCUMENTS

| | | | | |
|---|---|---|---|---|
| 7,120,784 B2 * | 10/2006 | Alexander | .......... | G06F 9/30189 712/240 |
| 9,563,430 B2 * | 2/2017 | Bonanno | ............... | G06F 9/3844 |
| 2002/0029333 A1 | 3/2002 | Talcott | | |
| 2008/0263341 A1 | 10/2008 | Ozer et al. | | |
| 2011/0087866 A1 * | 4/2011 | Shah | ..................... | G06F 9/3851 712/E9.056 |
| 2014/0019738 A1 * | 1/2014 | Kataoka | ................ | G06F 9/3851 712/240 |
| 2015/0339126 A1 * | 11/2015 | Bonanno | ............... | G06F 9/3844 712/239 |
| 2017/0147346 A1 * | 5/2017 | Hornung | ............... | G06F 9/3844 |
| 2018/0173533 A1 | 6/2018 | Soundararajan et al. | | |
| 2020/0297167 A1 | 9/2020 | Green | | |

OTHER PUBLICATIONS

PCT/US23/22495 Search Report.

* cited by examiner

*Primary Examiner* — Corey S Faherty
(74) *Attorney, Agent, or Firm* — File-EE-Patents.com; Jay A. Chesavage

(57) ABSTRACT

An exemplary branch predictor apparatus comprises a Pattern History Table (PHT) configured with a PHT allocation multiplexer/demultiplexer (PAMD) configurable to output a prediction logically selected from a portion of the PHT entries selectively allocated among a plurality of threads. The PHT entries may be allocated among a plurality of threads based on control bits read from a Control and Status Register (CSR) at system initialization. The branch predictor may govern a plurality of threads fetching instructions from an address selected from a Branch Target Buffer (BTB) entry indexed based on a per-thread Program Counter (PC) or a PHT entry indexed based on a per-thread Global History Register (GBHR). The PHT entries may be saturating binary counters. The saturating counters may be two-bit counters. An exemplary implementation may permit reduced misprediction rate, increased throughput, or reduced energy consumption resulting from increased allocation of PHT entries to more branch-intensive threads.

20 Claims, 6 Drawing Sheets

DYNAMIC ALLOCATION OF PATTERN HISTORY TABLE (PHT) FOR MULTI-THREADED BRANCH PREDICTORS

CROSS-REFERENCE TO RELATED APPLICATIONS

None.

TECHNICAL FIELD

This disclosure relates generally to branch prediction in a computer processor.

BACKGROUND

Branch prediction is next address prediction. A computer processor may fetch processor executable instructions from an address determined by a program counter (PC) configured in the processor. Control logic configured in the processor may direct the PC to the next address by adding a predetermined offset to the PC in the case of normal program flow. In some scenarios the next address may be determined by loading the PC with an address determined as a function of a condition encountered by the processor. Such a condition encountered by the processor may be a branch condition.

A conditional branch may load the PC with a next address that may change from branch to branch, depending on the branch condition. Such a conditional next address may depend on a processor operation result or status, such as whether two operands compared equal. Some programs and processing environments may encounter many different branch conditions. A program that frequently branches to an instruction sequence that is different from normal program flow may be referred to as a branch-intensive program. Successfully predicting branch behavior may increase processor performance, reduce or eliminate pipeline stalls, and reduce execution time. In the present disclosure references to execution time in relation to branch prediction are intended to be understood as meaning program execution time and not instruction execution time. For example, if a branch prediction is accurate, then we can execute the program faster as flushes will then be reduced. The cycles per instruction might increase depending on the latency added to the pipeline by the branch predictor.

A branch predictor implementation may be configured to predict the next address determined by a conditional branch. In a pipelined processor there may be a significant penalty for mis-predicting a branch. For example, if the PC of a pipelined processor is loaded with a next address determined based on an assumption that a conditional branch would be taken, the pipeline may need to be flushed and execution may stall if program execution results in the branch not taken. Some processors may execute multiple threads with a diversity of branch intensiveness among the multiple threads. For example, some threads may branch in patterns predictable with high probability, while other threads may be less predictable. A branch predictor configured in a multi-threaded processor may have a higher misprediction rate for some threads than other threads based on the workload associated with that thread.

SUMMARY

An exemplary branch predictor apparatus comprises a Pattern History Table (PHT) configured with a PHT allocation multiplexer/demultiplexer (PAMD) configurable to output a prediction logically selected from a portion of the PHT entries selectively allocated among a plurality of threads. The PHT entries may be allocated among a plurality of threads based on control bits read from a Control and Status Register (CSR) or via other software or hardware mechanisms. The branch predictor may govern a plurality of threads fetching instructions from an address selected from a Branch Target Buffer (BTB) entry indexed based on a per-thread Program Counter (PC) or a PHT entry indexed based on a per-thread Global History Register (GBHR). The PHT entries may be saturating binary counters. The saturating counters may be two-bit counters. An exemplary implementation may permit reduced misprediction rate, increased throughput, or reduced energy consumption resulting from increased allocation of PHT entries to more branch-intensive threads.

An example implementation in accordance with the present disclosure may comprise a branch predictor designed with configurable per-thread allocation of Pattern History Table (PHT) entries. The branch predictor may be designed with control bits governing distribution of available PHT entries as a shared resource among multiple threads, permitting allocation of more PHT entries to more branch-intensive threads, and fewer PHT entries to less branch-intensive threads. A portion of the PHT entries may be configured to provide a branch direction prediction logically selected as a function of per-thread Program Counter (PC) and the control bits' configuration. It will be appreciated that PHT entries only provide the branch outcome prediction. The branch outcome prediction only indicates Taken and Not Taken direction. In an exemplary implementation, the address to which the branch should jump is given by the BTB. In an illustrative example, the PHT provides the direction, and BTB gives the address, and the combination of the PHT and BTB provide a prediction of whether the branch should be taken or not, and if Taken, to what address should it jump.

In another example implementation in accordance with the present disclosure the PHT entries may be saturating counters. The predicted branch direction may be selected from a PHT entry indexed using an exclusive-or (XOR) of per-thread global branch history with a portion of a branch address determined by the instruction fetch stage while making a prediction.

In another example implementation in accordance with the present disclosure the PHT entries may be organized in segments. Each PHT segment may be comprise a plurality of PHT entries, permitting zero, one, or more than one segment of PHT entries to be allocated to each thread of a plurality of threads, according to the control bits.

In another example implementation in accordance with the present disclosure the predicted branch direction may be selected from among a plurality of PHT segments by a PHT allocation multiplexer/demultiplexer (PAMD). The PAMD may comprise a plurality of multiplexer and demultiplexer modules governed by the control bits to allocate the PHT segments among the multiple threads. Two or more PHT segments may be logically concatenated to form a larger PHT segment allocated to a particular thread, based on the control bits' configuration.

In another example implementation in accordance with the present disclosure the control bits governing allocation of PHT entries among the multiple threads may be configured in a PHT Allocation Control and Status Register (CSR). The CSR may be configured by the user, operating system (OS) or by any other software or hardware mechanism as a design choice to allocate PHT entries among threads based on the thread's branch behavior.

Various implementations may achieve one or more technical effect. For example, a branch predictor implementation designed in accordance with the present disclosure may increase the overall efficiency of a processor core. Such improved processor efficiency may be a result of reduced or eliminated pipeline flushes or stalls using a branch predictor designed to permit per-thread allocation of PHT entries according to the branch prediction needs of each thread. For example, a branch predictor implementation in accordance with the present disclosure may permit allocating more PHT entries to more branch-intensive threads. Allocating more PHT entries to more branch-intensive threads may result in improved branch prediction accuracy and reduced branch misprediction for those threads, improving overall processor performance.

A branch predictor implementation designed in accordance with the present disclosure may reduce power consumed by a processor core. Such reduced processor core power consumption may be a result of a branch predictor design permitting conservation of PHT entries. Such PHT entry conservation may be result of a branch predictor configured to permit allocating PHT entries only to threads for which branch prediction is desired, not allocating PHT entries to threads for which branch prediction is not desired or allocating fewer PHT entries to some threads than other threads. Such optimized per-thread PHT entry allocation may improve overall processor performance, based on allocating PHT entries to threads as needed, and may improve power efficiency in contrast with a branch predictor design configured to statically allocate PHT entries to threads. For example, some branch predictor implementations may reduce power consumption based on eliminating updates to a per-thread Branch Target Buffer (BTB) or Global Branch History Register (GBHR) for threads having branch prediction deactivated.

In an aspect, an apparatus may comprise: a Pattern History Table (PHT) having a plurality of PHT entries, wherein the PHT is configured with a PHT allocation multiplexer/demultiplexer (PAMD) configurable to provide a predicted branch direction logically selected from a portion of the plurality of PHT entries selectively allocated among a plurality of threads.

The PAMD may further comprise a plurality of PAMD modules, wherein each PAMD module of the plurality of PAMD modules is configured with at least one input, at least one output, and at least one select input configured to govern the at least one output determined as a function of the at least one input and at least one select input.

The plurality of PAMD modules may further comprise at least one multiplexer.

The plurality of PAMD modules may further comprise at least one demultiplexer.

At least one select input of at least one of the plurality of PAMD modules may be configured to be governed by at least one configurable control bit.

The apparatus may further comprise a Control and Status Register (CSR) having a plurality of control bits configured to govern per-thread allocation of PHT entries based on at least one logical function of at least one of the plurality of control bits.

Each PHT entry may further comprise a n-bit saturating counter.

The apparatus may further comprise a GShare or any branch predictor which uses PHTs.

The predicted address output may be provided as an input to a fetch stage of a pipelined processor.

In another aspect, an apparatus may comprise: a Branch Target Buffer (BTB) having a plurality of BTB entries, an index input, and an address output, wherein the BTB is configured to provide on the address output a target address indexed in the BTB based on an address received from a per-thread Program Counter (PC) on the index input; a Pattern History Table (PHT) comprising a PHT read index input, a plurality of PHT entries wherein each PHT entry of the plurality of PHT entries comprises a saturating binary counter, and a branch prediction output, wherein the PHT is configured to provide on the branch prediction output an indication of a taken or not taken prediction by a saturating binary counter PHT entry indexed based on a per-thread Global Branch History Register (GBHR) operably coupled with the per-thread Program Counter (PC); and a PHT allocation multiplexer/demultiplexer (PAMD) comprising a plurality of PAMD modules operably coupled with the PHT, wherein each PAMD module of the plurality of PAMD modules has at least one select input governing at least one PAMD module output determined as a logical function of at least one of a plurality of control bits configurable to output a predicted address logically selected from a portion of the plurality of PHT entries selectively allocated among a plurality of threads.

The PHT may comprise a plurality of PHT segments.

The plurality of PAMD modules may be configured to logically concatenate a portion of the plurality of PHT segments.

Each PHT segment of the plurality of PHT segments may have two hundred fifty-six entries.

The PHT read index input may be supplied with an address determined as a function of a fetch address received from a program counter (PC).

The PHT may further comprise a PHT write index input supplied with an address determined as a function of a branch outcome from an execution stage of a pipelined processor.

The PHT may further comprise a predicted branch direction operably coupled with a pipelined processor.

In another aspect, an apparatus may comprise: a Branch Target Buffer (BTB) having a plurality of BTB entries, an index input, and an address output, wherein the BTB is configured to provide on the address output a target address indexed in the BTB based on an address received from a per-thread Program Counter (PC) on the index input; a Pattern History Table (PHT) configured with a plurality of PHT segments each comprising a plurality of PHT entries, wherein each PHT entry of the plurality of PHT entries comprises a saturating n-bit counter, a PHT read index input, a PHT write index input supplied with an address determined as a function of a branch outcome and PC from an execution stage of a pipelined processor, and a branch prediction output, wherein the PHT is configured to provide on the branch prediction output an indication of a taken or not taken prediction by a saturating binary counter PHT entry indexed based on per-thread Global Branch History Register (GBHR) operably coupled with the per-thread Program Counter (PC); and a PHT allocation multiplexer/demultiplexer (PAMD) comprising a plurality of PAMD modules operably coupled with the PHT, wherein each PAMD module of the plurality of PAMD modules has at least one select input governing at least one PAMD module output determined as a logical function of at least one of a plurality of control bits configurable to provide a predicted branch direction logically selected from a portion of the plurality of PHT segments selectively allocated among a plurality of threads, and wherein the predicted branch direction is operably coupled with a fetch stage of the pipelined processor. The plurality of threads may be any number of threads greater than one.

The plurality of control bits may further comprise m bits controlling PHT segment allocation to each thread, where m is a function of number of threads.

A number of the plurality of threads may be not greater than the number of the plurality of PHT segments.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
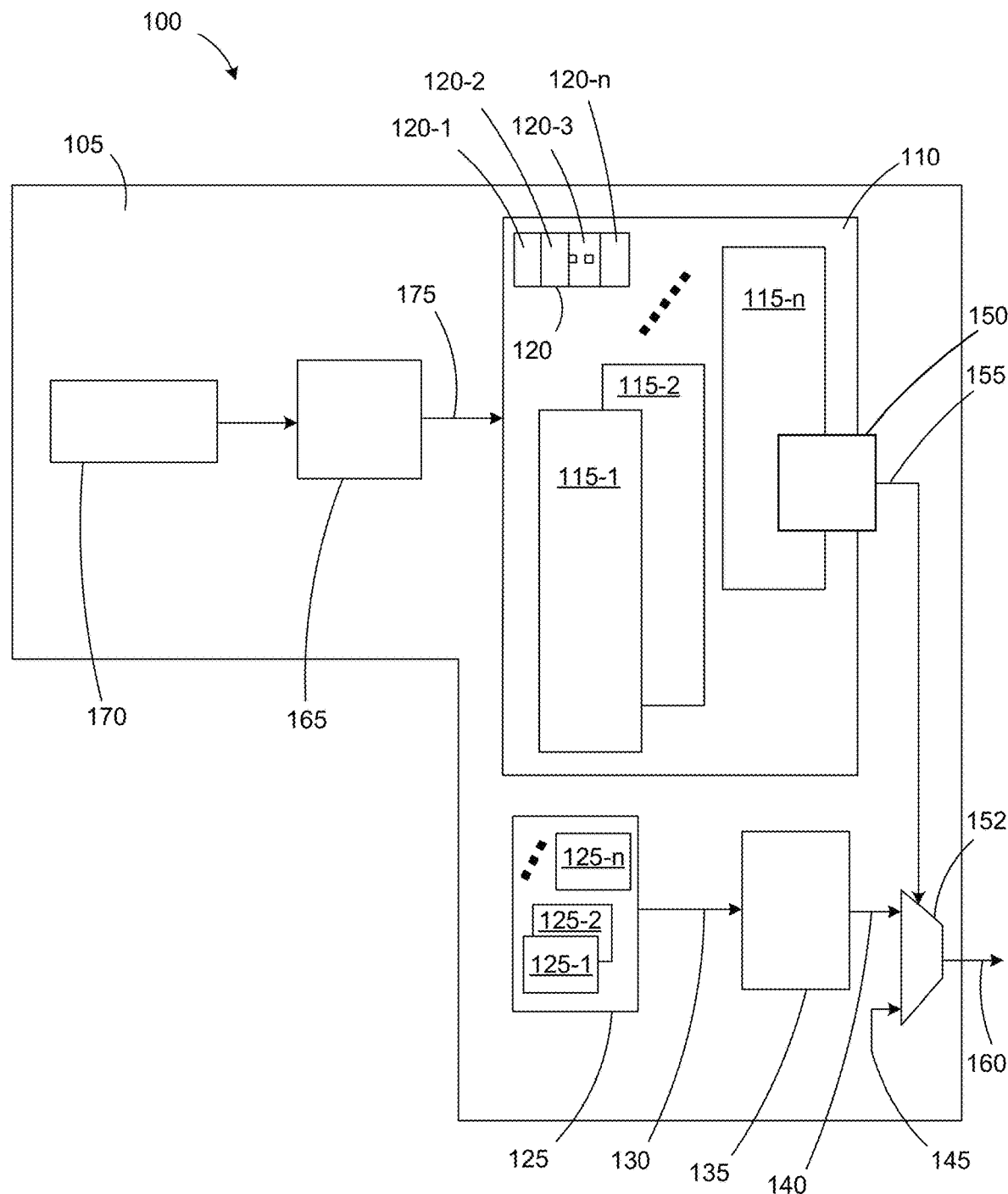
FIG. 1 depicts a block diagram view of an exemplary branch predictor comprising a Pattern History Table (PHT) configured with a PHT allocation multiplexer/demultiplexer (PAMD) configurable to output a prediction logically selected from a portion of the PHT entries selectively allocated among a plurality of threads in an implementation in accordance with the present disclosure.

To aid understanding, this document is organized as follows. First, a hierarchical general description distinct from the description of the drawings is presented. Second, exemplary design of dynamic Pattern History Table (PHT) allocation for multi-threaded branch predictors is briefly introduced with reference to FIGS. 1-2. Third, with reference to FIGS. 3A-3B and 4A-4B, the discussion turns to exemplary implementations that illustrate PHT design for multi-threaded branch prediction. Specifically, PHT and saturating counter PHT entry implementations are presented. Then, with reference to FIGS. 5-6, exemplary dynamic PHT allocation implementations configured to output a prediction logically selected from a portion of the PHT entries determined by a multiplexer/demultiplexer system governed by configurable control bits are disclosed to present improvements in branch predictor technology.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features. In particular, it is noted that the respective implementation features, even those disclosed solely in combination with other implementation features, may be combined in any configuration excepting those readily apparent to the person skilled in the art as nonsensical.

The present disclosure teaches branch prediction. Branch prediction may be implemented as an apparatus. The apparatus may comprise a branch predictor. The apparatus may be implemented using hardware components designed in accordance with the present disclosure.

The branch predictor may comprise a Pattern History Table (PHT). The PHT comprises a plurality of PHT entries. Each PHT entry of the plurality of PHT entries may comprise branch history of a particular branch. The branch history of the particular branch may be referred to as a local history for that branch. Each PHT entry may be a saturating counter. The saturating counter may be an n-bit saturating counter wherein n may be any integer 1, 2, . . . . N. The saturating counter may be a two-bit saturating counter, that is, an n-bit saturating counter wherein n=2. The PHT may comprise a memory storing the PHT entries. The PHT may be configured with any useful number of PHT entries. An exemplary PHT may comprise a plurality of PHT entries organized in a plurality of PHT segments. Each PHT segment of the plurality of PHT segments may comprise a portion of the plurality of PHT entries. An exemplary PHT may comprise a 256×2 memory having a base size of 256 PHT entries wherein each of the 256 PHT entries store two local branch history bits from a two-bit saturating counter. A portion of the plurality of PHT segments may be logically concatenated to form one or more PHT segment that is larger than a PHT base segment size. For example, two 256-entry PHT segments may be concatenated to form a 512×2 PHT segment, four 256-entry PHT segments may be concatenated to form a 1024×2 PHT segment, and so on. The individual or concatenated PHT segments may be selectively allocated to a plurality of threads to predict branch behavior using the threads' local branch history stored in the saturating counters of the respective PHT entries. The local branch history bits represent the state of the saturating counter. In an illustrative example the local history bits stored in a particular PHT entry may be used to determine a prediction for whether the particular branch associated with that PHT entry will be taken, or not taken. An exemplary PHT may be configured with an output comprising a taken or not taken prediction determined by the PHT. The output of an exemplary PHT may be used to determine the next Program Counter (PC) value for a processor. The taken or not taken prediction determined by the PHT may be based on the local branch history bits from the saturating counter stored in a PHT entry associated with a particular branch. An exemplary PHT may be configured to interact with a pipelined processor execute (EX) stage to update the PHT entry for a particular branch using the actual branch outcome determined by the EX stage and using the state machine in case of misprediction. The PHT may comprise an input configured to receive the branch outcome determined by the EX stage and update the PHT entry for a particular branch using the actual branch outcome result. An exemplary PHT may comprise an input configured to receive an index input into the PHT. The PHT may be configured to select a PHT entry determined by the PAMD based on the index input. The PHT entry selected by the PAMD based on the index input may be used to determine a prediction for whether the particular branch associated with that PHT entry will be taken, or not taken. The local branch history state stored by the PHT entry selected based on the index input may be updated from the actual branch outcome determined by the EX stage. An exemplary PHT may comprise at least one read port and at least one write port, wherein the PHT may be configured to simultaneously use the at least one read port and at least one write port to simultaneously perform both update and prediction.

The branch predictor may comprise a Global Branch History Register (GBHR). An exemplary GBHR may comprise a plurality of bits configured as an n-bit shift register wherein n may be any integer 2, 3, . . . . N. The GBHR may be configured to store in the shift register bits the actual directions of the n most recent branches considered globally. For example, an exemplary GBHR configured with an n-bit shift register wherein n=8 may implement an 8-bit shift register storing the directions of the last 8 (eight) branch instructions. An exemplary GBHR may comprise a plurality of GBHR shift registers. Each GBHR shift register of the plurality of GBHR shift registers may be configured for a respective plurality of threads to store the actual directions of the most recent branches considered globally on a per-thread basis. The GBHR may be configured to interact with a pipelined processor EX stage to update the shift register with the actual branch outcome. The GBHR may comprise an input configured to receive the branch outcome. The GBHR may be configured to update the shift register bits with the branch outcome. An exemplary branch predictor may comprise hash function logic configured to generate an address supplied to the PHT index input for selecting a PHT entry. The branch predictor may comprise a hash function configured to determine an index into the PHT. The GBHR hash function logic may implement any hash function useful to produce a PHT index input for selecting a PHT entry. The GBHR hash function logic may comprise a plurality of exclusive-or (XOR) function units. The GBHR hash function may determine the index into the PHT as a function of branch history and a PC value determined by a processor execute or fetch stage. The index into the PHT may be a read index while making a prediction. The index into the PHT may be a write index while training the predictor. The hash function may be a function of a portion of address bits from a processor execute or fetch stage. The hash function may comprise an exclusive-or (XOR) function. The hash function may be a function of a portion of address bits and global branch history. The branch history may be global branch history. The global branch history may be maintained by the GBHR. The GBHR may comprise per-thread branch history registers. The GBHR may be configured to use a first XOR unit to produce an XOR of the shift register value with the PC from a fetch stage, to generate a PHT read index supplied to the PHT. The GBHR may be configured to use a second XOR unit to produce an XOR of the shift register value with the PC from an execute stage, to generate a PHT write index supplied to the PHT. The GBHR may be configured to shift the contents of the register in an exemplary update cycle along with producing a write address for PHT, to generate a PHT write index supplied to the PHT. An exemplary GBHR may be configured to implement a Left-shift using the shift register.

The branch predictor may comprise a Branch Target Buffer (BTB). The BTB comprises an address input of a current PC received from a per-thread program counter (PC). The BTB may be configured to receive the input PC from the fetch stage, for evaluation of the corresponding target PC. The BTB may be configured to update the BTB entry with the branch PC determined by the EX stage, in the event actual evaluation of the branch results in a new target PC. The BTB comprises a target address output provided to PHT selection logic for determining the predicted branch address. The BTB is configured to provide the target PC to the next stage of the processor pipeline when the PHT prediction is "taken" for the respective current PC. The BTB may comprise a plurality of BTB entries. Each BTB entry may comprise a current PC to target PC mapping. Each BTB entry may be a (current PC, target PC) pair. Each BTB entry may comprise an indication of whether the entry is valid. A BTB entry marked valid may store a current PC-target PC pair that has been determined correct when a branch was later evaluated in the EX stage. The BTB may be direct-mapped. The BTB may be a 32-entry direct-mapped memory. The BTB may be set associative. The BTB may be a 32-entry, 4 (four) way set associative memory. The BTB may comprise a two-port memory configured to permit simultaneous read and write operations respectively from and to different read and write indices of the BTB memory.

The branch predictor may comprise PHT segment allocation logic configured to selectively allocate a plurality of PHT segments among a plurality of threads in a multi-threaded processor. Each PHT segment may be supplied with a common read index. The read index supplied to each PHT segment may be determined as a function of a per-thread GBHR value, the request thread-ID, and the request PC from the fetch stage. The PHT allocation logic may comprise combinational logic and a multiplexer system configured to select a final prediction from the plurality of PHT segments allocated to a particular thread. The multiplexer system comprises a plurality of multiplexers in the PHT read path. The multiplexer logic may be configurable with control bits determining the selection of the final prediction from the PHT segments allocated to the corresponding thread. Each PHT segment may be supplied with a common write index. The write index supplied to each PHT segment may be determined as a function of a per-thread GBHR value, the response thread-ID, and the update PC from the execute stage. The PHT allocation logic may comprise combinational logic and a demultiplexer system configured to enable a PHT segment to update the PHT entry selected by the write index. The demultiplexer system comprises a plurality of demultiplexers in the PHT write path. The demultiplexer logic may be configurable with control bits determining the selection of the PHT segment allocated to the corresponding thread.

The branch predictor may comprise control bits governing the PHT segment allocation multiplexer/demultiplexer system. The control bits may be configurable in a Control and Status Register (CSR). An exemplary branch predictor CSR may encode a plurality of control bits defining how many PHT segments to reserve for a particular thread. In an illustrative example, control bits encoded by the branch predictor CSR may be configured by a user, operating system (OS) or any other hardware/software means to control allocation of PHT segments among a plurality of threads. In an exemplary implementation the control bit values configured in the branch predictor CSR may be read by the branch predictor. The branch predictor may be configured to create a plurality of internal registers corresponding to the control bits read from the CSR. The internal registers may be written with bit values indicating which PHT segments are allocated to which thread among a plurality of threads. In an exemplary implementation, the branch predictor's PHT allocation multiplexer/demultiplexer system may be configured with combinational logic using values of the internal register bits as select signals to the multiplexer/demultiplexer units. The multiplexer units may be configurable using the control bits to output a prediction from a PHT segment selected as a logical function of the control bits. The demultiplexer units may be configurable using the control bits to enable a PHT segment to update a PHT entry selected as a logical function of the control bits.

Branch prediction may be implemented as a method. The method may comprise using a branch predictor. The method may be implemented using branch predictor components designed in accordance with the present disclosure.

An exemplary branch prediction method may comprise measuring branch prediction behavior for one or more thread of at least one program, determining relative branch intensiveness of the one or more thread, and configuring the control bits in the CSR to allocate more PHT segments to the more branch intensive threads. In some implementations, a branch prediction method may comprise statically analyzing processor executable program instructions comprising a thread of execution, to determine the branch intensiveness of that thread. In some implementations, static program analysis and run-time analysis may be applied to a multi-threaded program to identify branch intensive portions of the threads, and portions of the threads that are not branch intensive, to facilitate redesigning the software to coalesce branch intensive code into a subset of the threads. In one implementation, a user or system designer may design an application program or operating system to configure the CSR control bits to allocate more PHT segments to the more branch intensive threads. In some cases, the method may comprise categorizing branches' required response times as critical, important, or non-priority. For example, a branch in an execution path responding to prevent a catastrophic physical event may be characterized by a critical response time. Some branches' response times may be less critical, while important, and other branches may be non-priority with respect to response time.

An exemplary method may comprise identifying threads with branches in time-critical code paths as having critical response time requirements and configuring the CSR control bits to allocate more PHT segments to the threads having branches in time-critical control paths. Some branch predictor hardware implementations may be configured with hardware support for an exemplary branch prediction method. For example, an exemplary branch predictor apparatus may be configured to count branches, count mispredictions and count correct predictions on a per-thread basis. The branch, misprediction and correct prediction counts may be used by application software, an operating system, or any hardware system to identify branch intensive threads as a function of branches per unit time, or to identify threads with a higher misprediction rate. In an illustrative example, a system designer or operating system may be configured to adjust the PHT allocation in a subsequent system initialization using the CSR control bits, to assign more PHT segments to threads with a higher misprediction rate. In some implementations, an exemplary branch predictor may comprise registers configurable with per-thread misprediction thresholds, and logic configured to automatically adjust PHT segment allocation using the CSR control bits in response to a particular thread exceeding a configured misprediction threshold. An exemplary per-thread misprediction threshold register may be configurable with a percentage of mispredictions not to be exceeded after a learning period. The learning period may be configured in a register as a number of predictions to ignore before triggering re-allocation of the PHT segments. In an illustrative example, a per-thread misprediction threshold register may be configurable with any useful threshold percentage of mispredictions. The branch predictor may be configured to automatically trigger re-allocation of the PHT segments by adjusting the CSR control bits to assign more PHT segments to the threads exceeding a configured misprediction threshold percentage. For example, if a per-thread misprediction threshold register is configured for a misprediction rate of 10 (ten) percent for a particular thread, and over a period of time the misprediction rate was measured at 15 (fifteen) percent, an exemplary branch predictor may be configured to automatically flush the pipeline, reconfigure allocation of the PHT segments by adjusting the CSR control bits to assign more PHT segments to that thread, and resume execution using the adjusted PHT segment allocation.

The apparatus may further comprise a processor. The processor may further comprise a pipelined processor. The pipelined processor may further comprise a sequence of pipelined stages comprising an instruction fetch stage, an instruction decode stage, a decode/execute stage, an execute stage, a load/store stage, and optionally a writeback stage. The decode/execute stage may be operably coupled to a register file. The processor may be a multi-threaded processor configured to execute a plurality of threads using a respective plurality of per-thread program counter (PC) registers.

FIG. 1 depicts a block diagram view of an exemplary branch predictor comprising a Pattern History Table (PHT) configured with a PHT allocation multiplexer/demultiplexer (PAMD) configurable to output a prediction logically selected from a portion of the PHT entries selectively allocated among a plurality of threads in an implementation in accordance with the present disclosure. In FIG. 1, the apparatus 100 comprises the branch predictor 105. In the depicted implementation the branch predictor 105 includes the pattern history table (PHT) module 110. In the depicted implementation the PHT module 110 comprises a plurality of PHT segments, PHT segment-1 115-1, PHT segment-2 115-2, . . . , PHT Segment-n 115-n. In the depicted implementation each PHT segment of the plurality of PHT segments comprises a memory storing PHT entries comprising branch history local to at least one thread executing on a multi-threaded processor. The PHT allocation control and status register (CSR) 120 comprises a plurality of configurable control bit segments, 120-1, 120-2, 120-3, . . . , 120-n. In the depicted implementation the PHT allocation CSR 120 control bit segments each comprise two configurable control bits permitting adjustment of the allocation of the plurality of PHT segments among a plurality of threads. Allocating more PHT entries to more branch-intensive threads may result in improved branch prediction accuracy and reduced branch misprediction rates for those threads, improving overall processor utilization and reducing execution latency.

In the depicted implementation the per-thread program counter (PC) module 125 comprises a plurality of PC registers, thread-1 PC 125-1, thread-2 PC 125-2, ..., thread-n PC 125-n. In the depicted implementation each PC register of the plurality of PC registers governs the fetch addresses for a respective plurality of threads. In the depicted implementation the per-thread PC module 125 provides the current PC 130 for one thread at a time to the branch target buffer (BTB) 135 as an index to a BTB entry comprising a target PC 140. In the depicted implementation the target address 140 and the usual next PC 145 are provided to the PHT allocation multiplexer/demultiplexer module (PAMD) 150. The PAMD 150 may comprise a plurality of multiplexers, demultiplexers, and combinational logic configured to logically select a portion of the PHT segments to provide a branch prediction from a PHT entry or update the state of a PHT entry with actual branch outcome, based on the PHT allocation CSR 120 control bits, the request thread-ID, and request PC. In the depicted implementation the usual next PC 145 for normal execution flow is determined as a sum function of the current PC and the instruction size. In the depicted implementation multiplexer 152 is configured to use the taken/not-taken prediction 155 from the PHT module 110 to determine the predicted next PC 160 provided to the fetch stage of a pipelined processor. In the depicted implementation the taken/not-taken prediction 155 is determined by the PHT module 110 based on the hash function 165 applied to the request PC and global taken/not taken branch history from the Global Branch History Register (GBHR) Module 170. In the depicted implementation the hash function comprises an exclusive-or (XOR) unit. In the depicted implementation the GBHR 170 comprises an 8-bit shift register configured to store the directions of the last 8 branch instructions and provide the PHT index 175 determined as a function of an XOR of the branch history with the request PC. In the depicted implementation the PHT module 110 is configured to provide a branch prediction from a PHT entry or update the state of a PHT entry with actual branch outcome, based on the PHT index 175.

Figure 2:
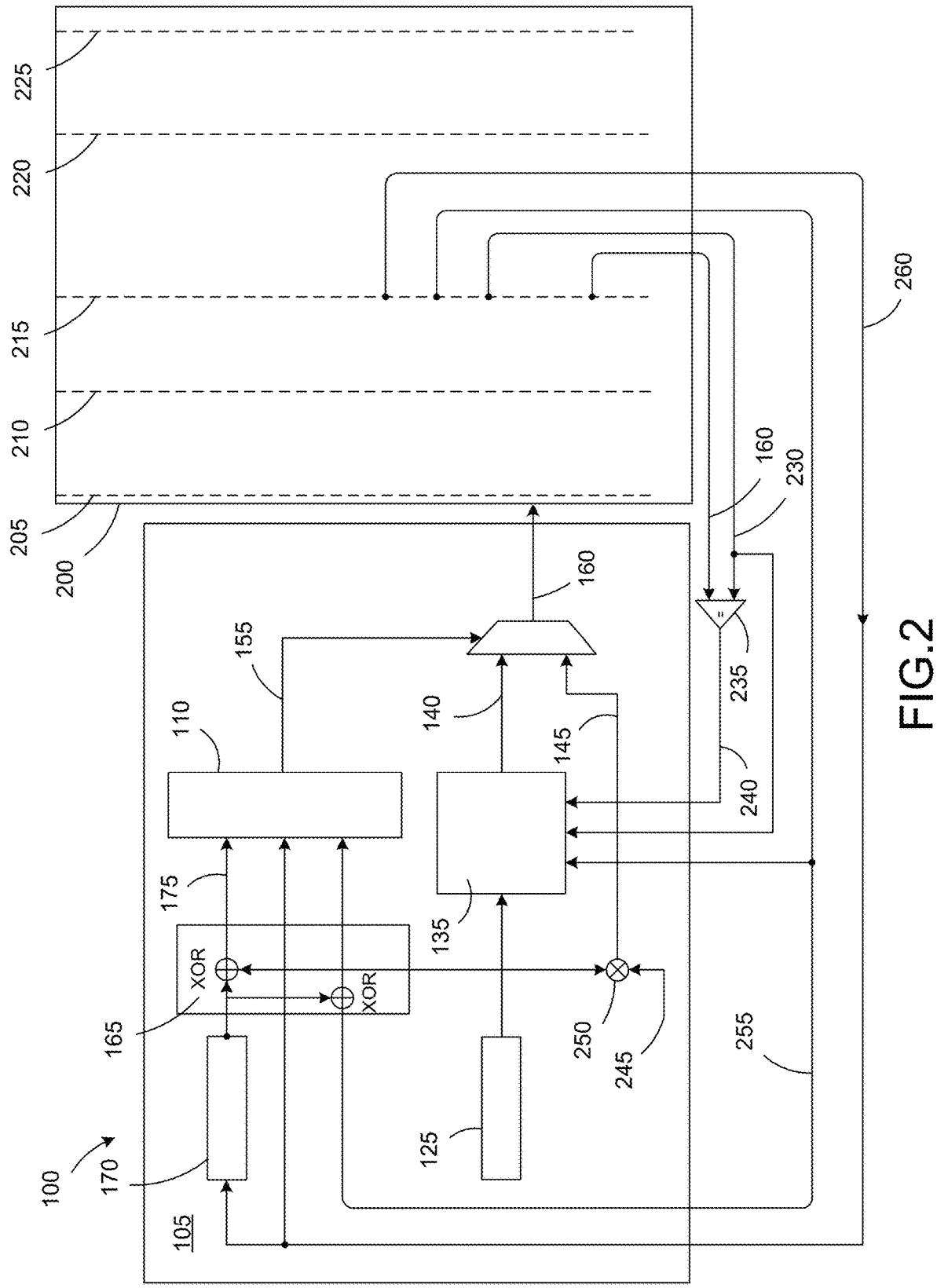
FIG. 2 depicts a block diagram view of an exemplary branch predictor interaction with fetch and execute stages of an exemplary processor pipeline in an implementation in accordance with the present disclosure.

FIG. 2 depicts a block diagram view of an exemplary branch predictor interaction with fetch and execute stages of an exemplary processor pipeline in an implementation in accordance with the present disclosure. In FIG. 2, the apparatus 100 comprises the pipelined processor 200 operably coupled with the branch predictor 105. The depicted implementation comprises the branch predictor 105 features described at least with reference to FIG. 1. In the depicted implementation the pipelined processor 200 is a multi-threaded pipelined processor configured to execute program instructions through pipeline stages comprising, in sequence, the fetch (IF) stage 205, the decode (DE) stage 210, the execute (EX) stage 215, the memory access (MA) Stage 220, and the writeback (WB) stage 225. In the depicted implementation the predicted next PC 160 from the branch predictor 105 and the next PC address 230 are provided to the prediction comparison 235 to determine the prediction correct 240 indication. The prediction correct/incorrect indication 240 may be used to update a BTB 135 entry, based on whether the predicted next PC 160 was correct when compared with the branch outcome determined by the execute stage 215. In the depicted implementation the instruction size 245 is added with the current PC by the next PC sum 250 to determine the usual next PC 145. In the depicted implementation the actual PC 255 from the execute stage is XORed with global history bits from the GBHR 170 to determine a PHT index 175. The PHT module 110 may update the indexed PHT entry based on the branch taken indication 260, depending on the branch outcome.

In an illustrative example, on reset all the contents of the BTB 135 are invalidated and the GBHR 170 bits may be set to 0 (zero). During the initial execution of a program no predictions are made, and when the branches are executed in the execute (EX) stage 215 the relevant branch execution information (PC, target-PC, taken/not-taken, mis-prediction) is passed to the branch predictor 105, with appropriate updates made into the BTB 135 (PC, Target-PC pair), GBHR 170 (taken/not-taken), and the indexed PHT entry is updated accordingly. When a new PC value is evaluated, the new PC value is used to look-up in the BTB 135 and XORed with the GBHR 170 bits to index a PHT entry. In the case of a BTB 135 lookup resulting in a hit in the BTB 135 and PHT direction taken, a prediction is made and the target address from the BTB 135 is provided to be updated into the appropriate PC for that thread. In the case when either there is a BTB 135 lookup resulting in a miss in the BTB 135 or PHT direction is not taken, no prediction is made and the default PC+4 (instruction size) value is loaded in the appropriate PC for that thread.

Figure 3A:
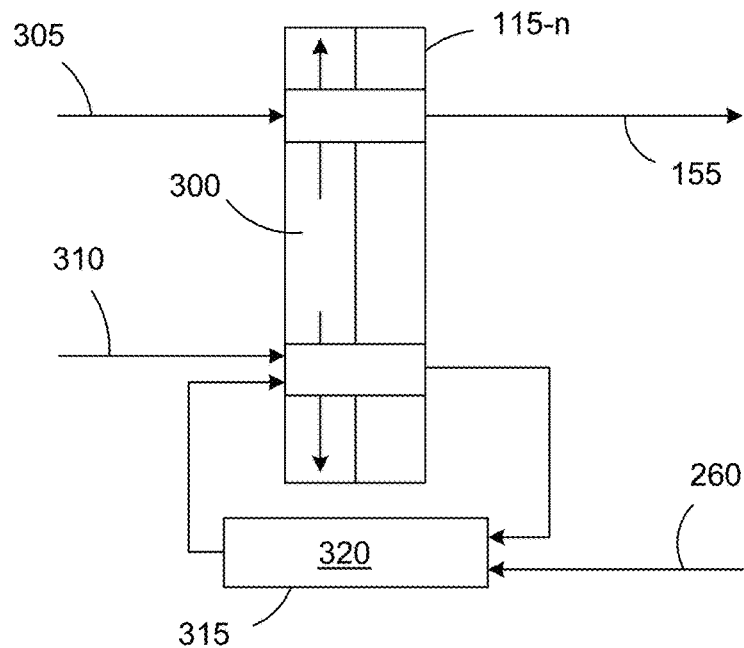
FIG. 3A depicts a schematic view of an exemplary PHT implementation in accordance with the present disclosure.

FIG. 3A depicts a schematic view of an exemplary PHT implementation in accordance with the present disclosure. In FIG. 3A, the depicted PHT segment 115-n is configured with N PHT entries 300. In the depicted implementation the PHT segment 115-n is configured with N=256 PHT entries. In the depicted implementation each PHT entry of the N=256 PHT entries may be accessed by the PHT Read Index 305 to determine a taken/not-taken prediction 155 based on the branch history stored in the PHT entry. In the depicted implementation each PHT entry of the N=256 PHT entries may be accessed by the PHT Write Index 310 to update the branch history stored in the PHT entry based on the branch outcome determined as a function of the branch taken indication 260. In the depicted implementation each PHT entry comprises a saturating counter 315 comprising saturating counter state 320. Each saturating counter 315 may comprise a two-bit saturating counter. The saturating counter state 320 may be represented as a state diagram, described with reference to FIG. 3B.

Figure 3B:
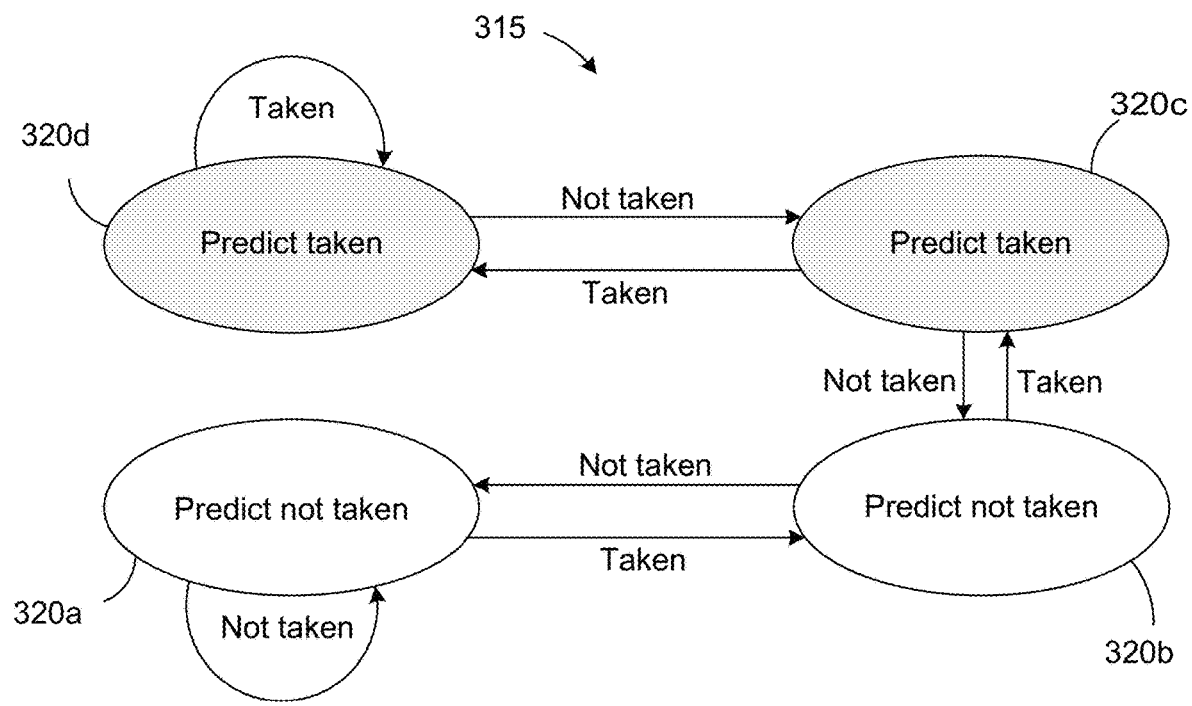
FIG. 3B depicts a state diagram view of an exemplary PHT entry implementation in accordance with the present disclosure.

FIG. 3B depicts a state diagram view of an exemplary PHT entry implementation in accordance with the present disclosure. In FIG. 3B, the saturating counter 315 comprises a two-bit saturating counter having saturating counter state 320. In the depicted implementation the saturating counter state 320 comprises the possible values: strongly not taken 320a, weakly not taken 320b, weakly taken 320c, and strongly taken 320d. On reset the saturating counter state 320 of each of the plurality of PHT entries is set to state weakly taken 320c. The indexed PHT entries contain two-bit values for the prediction outcome of the program counter (PC). The indexed PHT entry (saturating counter 315) is evaluated for each branch. Depending on whether the actual branch outcome was taken or not-taken and depending on whether the BTB 135 lookup is a hit or miss for the target PC, the program counter is updated, the program flow changes, and the saturating counter 315 is updated speculatively.

Figure 4A:
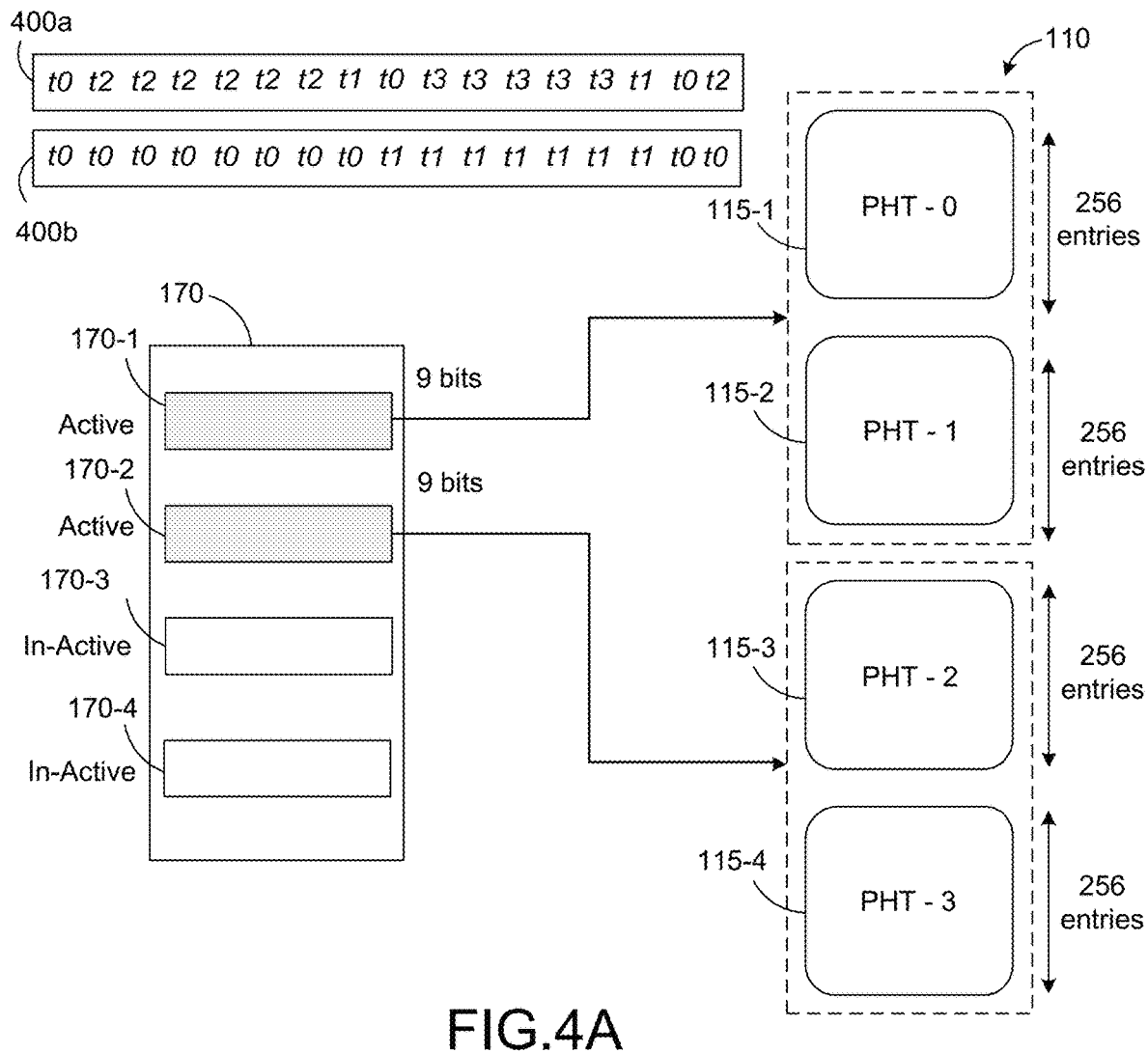
FIG. 4A depicts an operational view of exemplary per-thread PHT distribution among multiple threads in an implementation in accordance with the present disclosure.

FIG. 4A depicts an operational view of exemplary per-thread PHT distribution among multiple threads in an implementation in accordance with the present disclosure. In FIG. 4A, the exemplary thread scheduling example A 400a and thread scheduling example B 400b illustrate multi-threaded branch prediction using per-thread PHT allocation for active threads. Time increases from right to left in the depicted thread scheduling examples. In the depicted implementation the processor is a multithreaded processor supporting up to four threads of execution. In the depicted example four threads t0, t1, t2, and t3 are executing on the processor.

The depicted thread scheduling example A 400*a* begins with threads t2, t0, t1, and t3 scheduled in sequential slots, then t3 is scheduled in the next four sequential slots, then to is scheduled once followed by t1 scheduled once, then t2 is scheduled in the next six sequential slots, followed by t0 scheduled once. In one exemplary sub-sequence of thread scheduling example A 400*a* illustrated by FIG. 4A, t3 is scheduled twice, followed by to scheduled once, followed by t1 scheduled once, and then t2 is scheduled several times. For at least a portion of this exemplary sub-sequence t3 and t2 are scheduled repeatedly without intervening execution by another thread for several slots, so that t3 and t2 may benefit from additional branch prediction resources during this time. However, in the thread scheduling example A 400*a*, branch prediction could be deactivated for threads t0 and t1 without reducing stalls or misprediction, because the threads t0 and t1 are scheduled so infrequently that any branches by threads t0 and t1 will already be resolved by the time a prediction could be made. In the case of thread scheduling example A 400*a*, branch prediction resources would be wasted on threads t0 and t1.

In the case of thread scheduling example B 400*b* depicted by FIG. 4A, thread t1 is scheduled repeatedly without intervening thread t0 execution for almost half of the illustrated period of time, followed by thread to scheduled repeatedly without intervening thread t1 execution for the remaining time, and threads t2 and t3 are not scheduled. In this case, branch prediction could be deactivated for threads t2 and t3 without reducing stalls or misprediction, because the threads are not scheduled and therefore do not branch. However, threads t0 and t1 could benefit from additional branch prediction resources at least during the time each thread to and t1 is scheduled repeatedly in thread scheduling example B 400*b*.

For the depicted thread scheduling example B 400*b*, threads t0 and t1 are allocated additional PHT entries to reduce misprediction rates and improve overall performance. In the depicted implementation thread t0 is allocated PHT segment-1 115-1 and PHT segment-2 115-2. In the depicted implementation PHT segment-1 115-1 and PHT segment-2 115-2 are logically added or concatenated by multiplexing and combinational logic (depicted by FIGS. 5 & 6) to form a logical PHT segment comprising 512 PHT entries assigned to thread t0 for branch prediction based on local branch history stored in the 512 PHT entries assigned to thread to. In the depicted implementation the prediction from the 512 PHT entries assigned to thread to is provided based on a PHT entry referenced by a nine-bit index determined as a function of the GBHR segment-1 170-1 actively storing global branch history for thread t0. In the depicted implementation thread t1 is allocated PHT segment-3 115-3 and PHT segment-4 115-4. In the depicted implementation PHT segment-3 115-3 and PHT segment-4 115-4 are logically added or concatenated by multiplexing and combinational logic (depicted by FIGS. 5 & 6) to form a logical PHT segment comprising 512 PHT entries assigned to thread t1 for branch prediction based on local branch history stored in the 512 PHT entries assigned to thread t1. In the depicted implementation the prediction from the 512 PHT entries assigned to thread t1 is provided based on a PHT entry referenced by a nine-bit index determined as a function of the GBHR segment-2 170-2 actively storing global branch history for thread t1. In the depicted implementation the GBHR segment-3 170-3 and GBHR segment-4 170-4 are inactive, permitting BTB and GBHR updates to be eliminated for threads with branch prediction resources deallocated. The depicted example illustrates implementations in accordance with the present disclosure enable program level control over which threads have active branch prediction and their resource distribution, permitting improved prediction accuracy as a result of allocating more resources to more active threads and improving power efficiency based on reducing or eliminating BTB and GBHR updates for inactive threads as well as removing PHT access in case of threads with no PHT allocation.

Figure 4B:
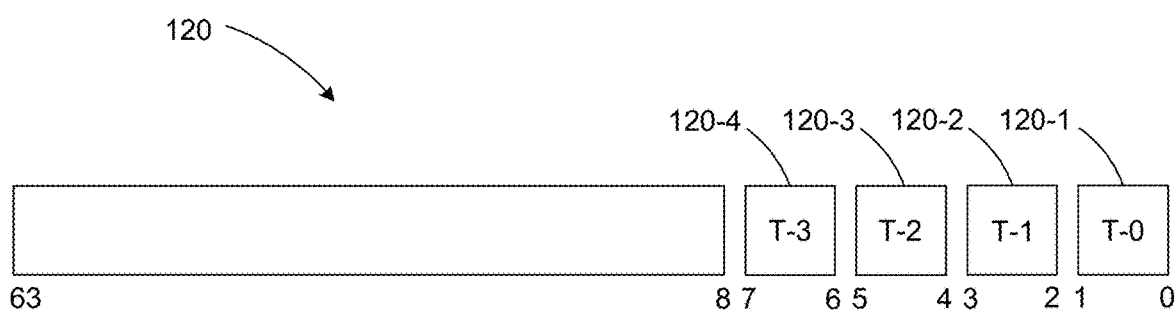
FIG. 4B depicts a bit-map view of an exemplary PHT Allocation Configuration and Status Register (CSR) in an implementation in accordance with the present disclosure.

FIG. 4B depicts a bit-map view of an exemplary PHT Allocation Control and Status Register (CSR) in an implementation in accordance with the present disclosure. In FIG. 4B, the PHT allocation CSR 120 comprises a plurality of configurable control bit segments, 120-1, 120-2, 120-3, . . . , 120-*n*. In the depicted implementation the PHT allocation CSR 120 control bit segments each comprise two configurable control bits permitting adjustment of the allocation of the plurality of PHT segments among a plurality of threads. In the depicted implementation, the control bit segment 120-1 controls PHT segment allocation to thread 0, the control bit segment 120-2 controls PHT segment allocation to thread 1, the control bit segment 120-3 controls PHT segment allocation to thread 2, and the control bit segment 120-4 controls PHT segment allocation to thread 3. The table below provides exemplary CSR 120 control bit encoding for PHT allocation.

TABLE 1

| PHT Allocation Encoding. | |
|---|---|
| 2 Bit Value Per Thread | PHT Allocation Per Thread |
| 00 | 0 PHT Allocated |
| 01 | 1 PHT Allocated |
| 10 | 2 PHT Allocated |
| 11 | 4 PHT Allocated |

In the implementation depicted by FIG. 4B, four PHT resources are available for up to four threads. In the depicted implementation each thread has an option of either 0, 1, 2 or 4 PHT segments allocated to itself, in such a way that total PHT segment allocation for all four threads does not exceed the total of four available threads. The CSR 120 is configured with 8 (eight) bits, 2 bits reserved for each thread. The value in the CSR 120 for any thread indicates how many PHT's the user wishes to reserve for that thread, according to Table 1.

In an illustrative example of the presently described implementation of 4 threads and 4 PHT's, the total PHT segments or tables that can be allocated are restricted to the maximum available four PHT segments for any thread individually or all threads in total. The branch predictor may be configured such that if the CSR 120 is written in such a way that the total PHT segments allocated would be greater than four (or the maximum available), the CSR 120 write should not be completed to the CSR 120 and a default value of 01010101 (1 PHT to each thread) should be written.

In the depicted implementation, after reading the CSR 120 value at system initialization, the branch predictor creates four internal registers, one register for each thread. These internal registers indicate which PHT segment is assigned to which Thread. In the depicted implementation configured with four PHT segments for four threads, the following example illustrates a possible PHT allocation scenario. A CSR 120 value of 01001001 will correspond to: T3:01, T2:00, T1:10, T0:01. This CSR 120 value of 01001001 will be used to program the 4 internal registers. These registers are four-bit values which are indicated as {D, C, B, A} and used as control signals to MUX out the outputs of PHT segments to give the final prediction and to select the PHT segment where an update is needed based on the response Thread-ID, as described with reference to FIGS. 5 & 6. These internal registers are mutually exclusive to each other and configured to ensure any PHT segment is not allocated to more than one thread for their use. The internal registers are configured whenever there is a write to the branch predictor CSR 120. These per-thread internal registers are read depending on the request Thread-ID whose request/response comes to the branch predictor and used to select the appropriate PHT where read/write is needed. Internally, for example in terms of an RTL implementation, the per-thread internal registers are referred to as T0_reg, T1_reg, T2_reg, and T3_reg, each with their respective DCBA four-bit value. For example:

T0_reg=0001, will indicate that Thread-0 is allotted PHT-0.
T1_reg=0110, will indicate that Thread-1 is allotted PHT-1 and PHT-2.
T2_reg=0000, will indicate that Thread-2 is not allotted any PHT.
T3_reg=1000, will indicate that Thread-3 is allotted PHT-3.

The table below describes potential combinations of DCBA values for the four-bit per-thread internal registers T0_reg, T1_reg, T2_reg, and T3_reg.

TABLE 2

Possible Combinations for four-bit per-thread register.

| Combination DCBA | Possible? | Description |
|---|---|---|
| 0000 | YES | Thread is not allocated any PHT |
| 0001 | YES | PHT-0 is allocated |
| 0010 | YES | PHT-1 is allocated |
| 0011 | YES | PHT-0 and PHT-1 are allocated |
| 0100 | YES | PHT-2 is allocated |
| 0101 | NO | Only continual PHTs will be allocated |
| 0110 | YES | PHT-1 and PHT-2 are allocated |
| 0111 | NO | 0, 1, 2 or 4 PHTs will be allocated |
| 1000 | YES | PHT-3 is allocated |
| 1001 | NO | Only continual PHTs will be allocated |
| 1010 | NO | Only continual PHTs will be allocated |
| 1011 | NO | 0, 1, 2 or 4 PHTs will be allocated |
| 1100 | YES | PHT-2 and PHT-3 will be allocated |
| 1101 | NO | 0, 1, 2 or 4 PHTs will be allocated |
| 1110 | NO | 0, 1, 2 or 4 PHTs will be allocated |
| 1111 | YES | All 4 PHT's will be allocated |

Figure 5:
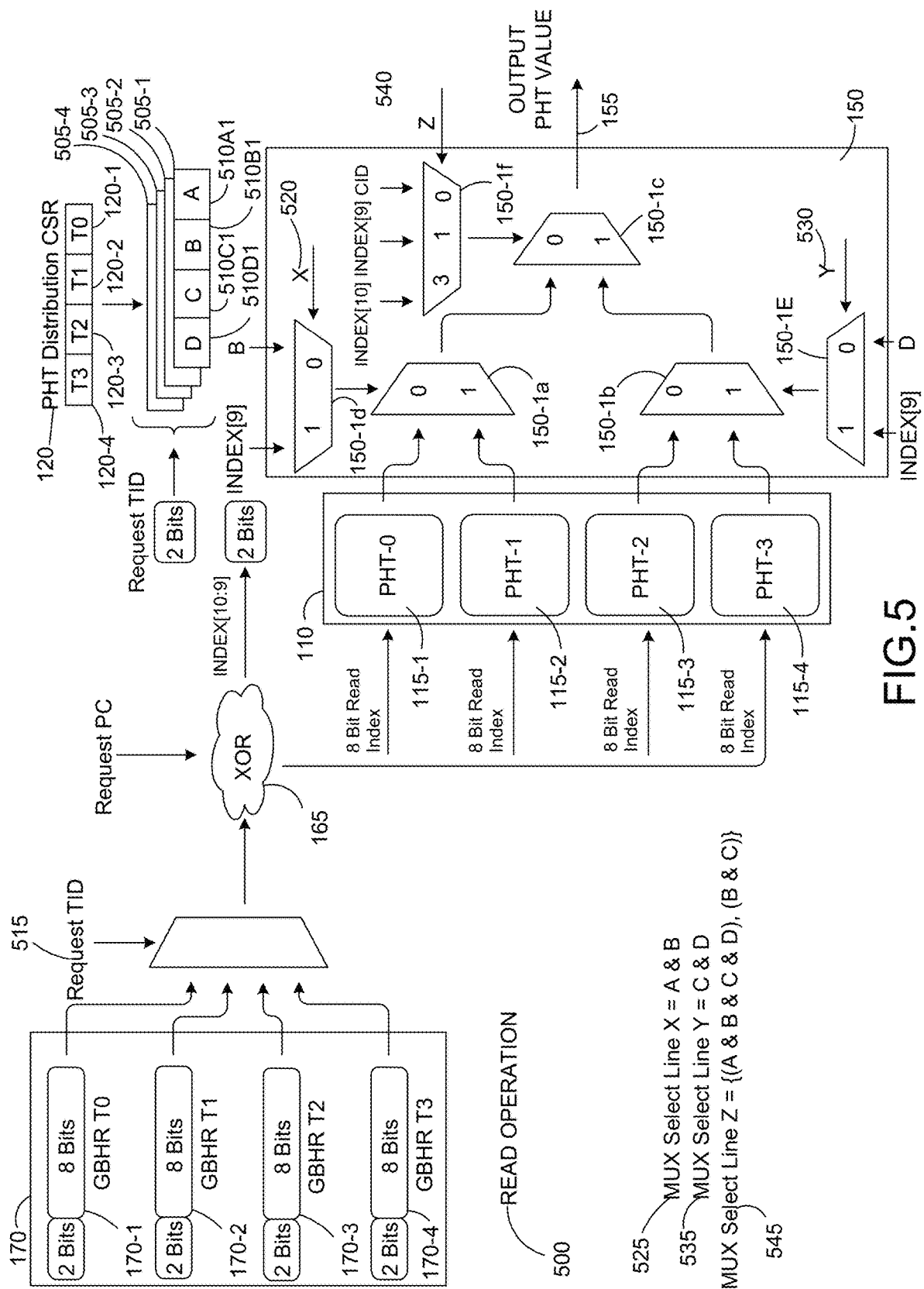
FIG. 5 depicts a schematic view of an exemplary Multi-Threaded GShare Branch Predictor in an exemplary read operation scenario in accordance with the present disclosure.

FIG. 5 depicts a schematic view of an exemplary Multi-Threaded GShare Branch Predictor in an exemplary read operation scenario in accordance with the present disclosure. In the multi-Threaded GShare branch predictor read operation example 500 depicted by FIG. 5, the PHT Allocation CSR 120 (also referred to as the PHT Distribution CSR 120) control bits define the PHT segment allocation to four threads T0, T1, T2, and T3 using the four respective internal registers T0_reg, T1_reg, T2_reg, T3_reg (corresponding to PHT Allocation Register n: 505-1, 505-2, 505-3, and 505-4) and the internal registers' respective DCBA values 510Dn, 510Cn, 510Bn, and 510An. In the depicted implementation the per-thread GBHR 170 value is selected from the respective GBHR segment-n 170-n using the request Thread-ID 515. The selected per-thread GBHR segment-n 170-n value is MUXed using the request Thread-ID 515 and the final per-thread 10 bit GBHR segment-n 170-n value is broken into two parts, comprising an eight-bit and a two-bit value. This ten-bit value is XORed with the request PC, and the lower eight bits of the XORed value is supplied to each of the PHT segments 115-1, 115-2, 115-3, and 115-4 as a read index to read the prediction from the respective PHT segments. In the depicted implementation the upper two bits of the XORed value and the two-bit request Thread-ID 515 is registered to meet the RAM latency. In the next stage, the request Thread-ID 515 is used to MUX the registers T0_reg, T1_reg, T2_reg, T3_reg (corresponding to PHT Allocation Register n: 505-1, 505-2, 505-3, and 505-4) resulting in a four-bit value represented as {D, C, B, A} in the diagram. In the depicted implementation the index bits 9 & 10 are used in cases when more than 1 PHT is allocated for the request thread identified by the request Thread-ID 515. The PHT PAMD 150 comprises MUX logic configured with combinational logic implemented to select the appropriate prediction from the PHT segments allocated to the corresponding thread resulting in the output PHT value taken/not taken prediction 155. In the depicted implementation the PHT PAMD 150 comprises multiplexer logic configured with select signals determined as a function of the DCBA values of the internal registers. In the depicted implementation the X signal 520 is determined by the function X=A & B 525, the Y signal 530 is determined by the function Y=C & D 535, and the Z signal 540 is determined by the function Z={(A & B & C & D), (B & C)} 545. In the illustrated implementation the function Z comprises the concatenation operator indicated by the curly braces. In the depicted implementation the X signal 520, the Y signal 530, and the Z signal 540 govern selection of the output PHT value taken/not taken prediction 155 from the PHT segments 115-1, 115-2, 115-3, and 115-4.

Figure 6:
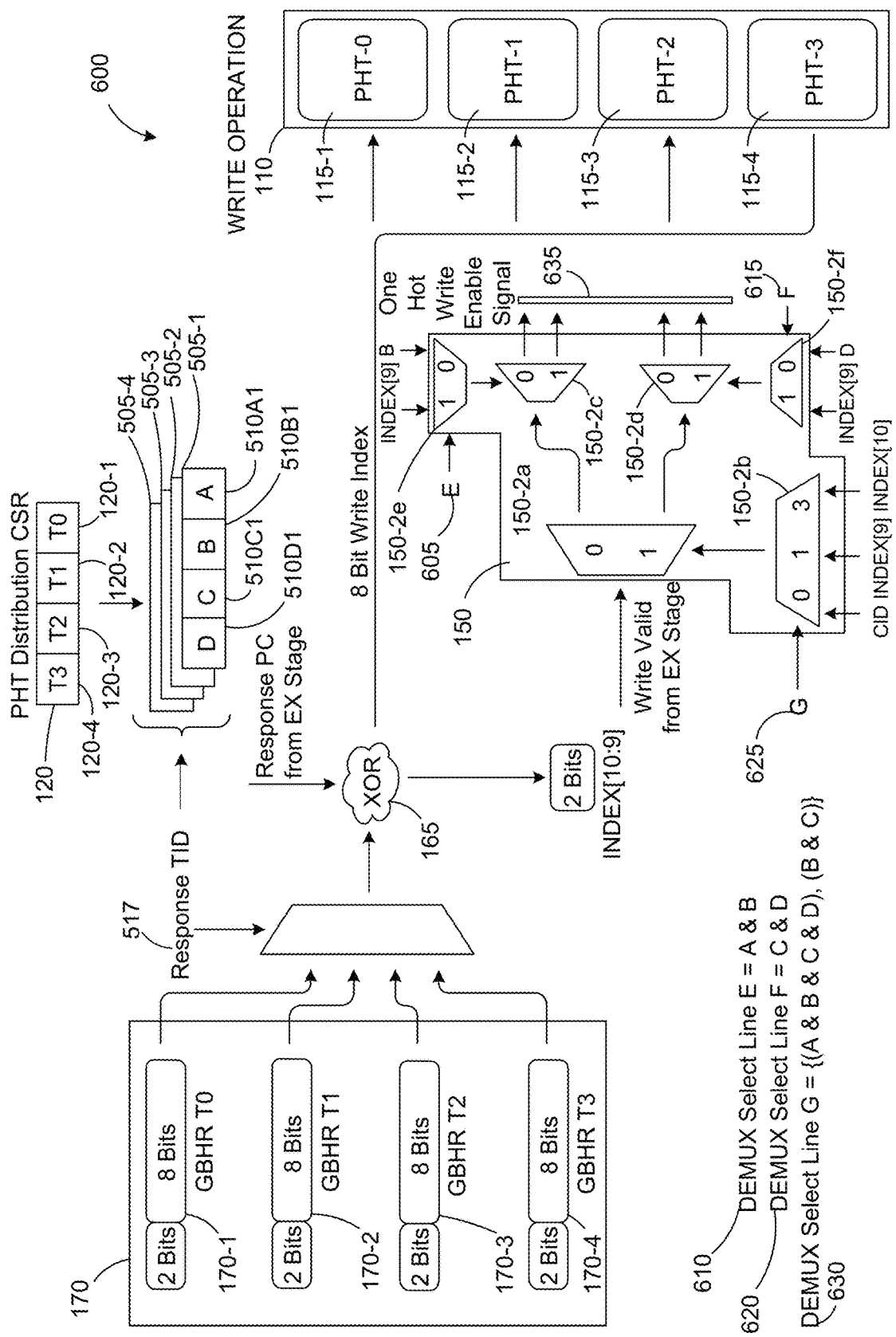
FIG. 6 depicts a schematic view of an exemplary Multi-Threaded GShare Branch Predictor in an exemplary write operation scenario in accordance with the present disclosure.

FIG. 6 depicts a schematic view of an exemplary Multi-Threaded GShare Branch Predictor in an exemplary write operation scenario in accordance with the present disclosure. In the multi-threaded GShare branch predictor write operation example 600 depicted by FIG. 6, the PHT Allocation CSR 120 (also referred to as the PHT Distribution CSR 120) control bits define the PHT segment allocation to four threads T0, T1, T2, and T3 using the four respective internal registers T0_reg, T1_reg, T2_reg, T3_reg (corresponding to PHT Allocation Register n: 505-1, 505-2, 505-3, and 505-4) and the internal registers' respective DCBA values 510Dn, 510Cn, 510Bn, and 510An. In the depicted implementation the per-thread GBHR value is selected from the respective GBHR segment-n 170-n using the response Thread-ID 517. The selected per-thread GBHR segment-n 170-n value is MUXed using the response Thread-ID 517 and the final per-thread ten-bit GBHR segment-n 170-n value is broken into 2 parts, comprising an eight-bit and a two-bit value. This ten-bit value is XORed with the response PC from the execute stage, and the lower eight bits of the XORed value is supplied to each of the PHT segments 115-1, 115-2, 115-3, and 115-4 as a write index to write the PHT segment. Though the write index is given to all the PHT segments 115-1, 115-2, 115-3, and 115-4, write_enable to the selected PHT segment is applied according to the DEMUX logic. The response TID 517 is used to MUX between the registers T0_reg, T1_reg, T2_reg, and T3_reg. The {D, C, B, A} value of these registers, along with the upper two bits of the ten-bit index is used in the logic to provide the final write_enable to the selected PHT segment. The PHT PAMD 150 comprises DEMUX logic configured with combinational logic implemented to select the appropriate PHT segments to be written with an updated taken/not taken prediction. In the depicted implementation the PHT PAMD 150 comprises demultiplexer logic configured with select signals determined as a function of the DCBA values of the internal registers. In the depicted implementation the E signal 605 is determined by the function E=A & B 610, the F Signal 615 is determined by the function F=C & D 620, and the G Signal 625 is determined by the function G={(A & B & C & D), (B & C)} 630. In the illustrated implementation the function G comprises the concatenation operator indicated by the curly braces. In the depicted implementation the E signal 605, the F Signal 615, and the G Signal 625 govern selection of the PHT segment 115-1, 115-2, 115-3, and 115-4 to be written with an updated taken/not taken prediction.

Although various features have been described with reference to the Drawings, other features are possible.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale and features of one implementation may be employed with other implementations as the skilled artisan would recognize, even if not explicitly stated herein. Descriptions of well-known components and processing techniques may be omitted so as to not unnecessarily obscure the implementation features.

Elements described herein as coupled or connected may have an effectual relationship realizable by a direct connection or indirectly with one or more other intervening elements.

In the present disclosure, the term "any" may be understood as designating any number of the respective elements, that is, as designating one, at least one, at least two, each or all of the respective elements. Similarly, the term "any" may be understood as designating any collection(s) of the respective elements, that is, as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. Use of the singular and plural is solely for the sake of illustration and is not to be interpreted as limiting.

The Abstract is provided to comply with 37 C. F. R. § 1.72 (b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of." In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

Throughout this disclosure and elsewhere, block diagrams or flowchart illustrations may depict methods, apparatuses (i.e., systems), and computer program products. Each element of the block diagrams or flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer or network systems over numerous topologies. Within this field, the configuration and management of large systems includes storage devices and computers that are communicatively coupled to dissimilar computers and storage devices over a network, such as the Internet.

The respective reference numbers and descriptions of the elements depicted by the Drawings are summarized as follows.

100 Apparatus
105 Branch Predictor
110 Pattern History Table (PHT) Module 115-1 PHT Segment-1
115-2 PHT Segment-2
115-n PHT Segment-n
120 PHT Allocation Control and Status Register (CSR)
120-1 PHT Allocation CSR Segment-1
120-2 PHT Allocation CSR Segment-2
120-3 PHT Allocation CSR Segment-3
120-n PHT Allocation CSR Segment-n
125 Per-thread Program Counter (PC) Module
125-1 Thread-1 PC
125-2 Thread-2 PC
125-n Thread-n PC
130 Current PC
135 Branch Target Buffer (BTB)
140 Target Address
145 Usual Next PC
150 PHT Allocation Multiplexer/Demultiplexer (PAMD)
150-1a Read Upper 2:1 Mux
150-1b Read Lower 2:1 Mux
150-1c Read Output 2:1 Mux
150-1d Read Upper 2:1 Select Mux
150-1e Read Lower 2:1 Select Mux
150-1f Read Output 4:1 Select Mux
150-2a Write Input 1:2 Select Demux
150-2b Write Lower Input 4:1 Select Mux
150-2c Write Upper Output 1:2 Demux
150-2d Write Lower Output 1:2 Demux
150-2e Write Upper Output 2:1 Select Mux
150-2f Write Lower Output 2:1 Select Mux
152 Select MUX
155 Taken/Not-taken Prediction
160 Predicted Next PC
165 Hash Function
170 Global Branch History Register (GBHR) Module
170-1 Global History Register (GBHR) Segment-1
170-2 Global History Register (GBHR) Segment-2
170-3 Global History Register (GBHR) Segment-3
170-4 Global History Register (GBHR) Segment-4
170-n Global History Register (GBHR) Segment-n
175 Final index given to PHT
200 Pipelined Processor
205 Pipelined Processor Fetch Stage
210 Pipelined Processor Decode Stage
215 Pipelined Processor Execute Stage
220 Pipelined Processor Memory Access (MA) Stage
225 Pipelined Processor Writeback (WB) Stage
230 Next PC Address
235 Prediction Comparison
240 Prediction Correct/Incorrect
245 Instruction Size
250 Next PC Sum
255 Actual PC from EX Stage
260 Branch Outcome
300 N PHT entries
305 PHT Read Index
310 PHT Write Index
315 Saturating Counter
320 Saturating Counter State
320a Strongly Not Taken
320b Weakly Not Taken
320c Weakly Taken
320d Strongly Taken
400a Thread Scheduling Example A
400b Thread Scheduling Example B
500 Multi-Threaded GShare Branch Predictor Read Operation Example
505-1 PHT Allocation Register 1
505-2 PHT Allocation Register 2
505-3 PHT Allocation Register 3
505-n PHT Allocation Register n
510A1 PHT Allocation Register 1 Segment A
510B1 PHT Allocation Register 1 Segment B
510C1 PHT Allocation Register 1 Segment C
510D1 PHT Allocation Register 1 Segment D
510A2 PHT Allocation Register 2 Segment A
510B2 PHT Allocation Register 2 Segment B
510C2 PHT Allocation Register 2 Segment C
510D2 PHT Allocation Register 2 Segment D
510A3 PHT Allocation Register 3 Segment A
510B3 PHT Allocation Register 3 Segment B
510C3 PHT Allocation Register 3 Segment C
510D3 PHT Allocation Register 3 Segment D
510An PHT Allocation Register n Segment A
510Bn PHT Allocation Register n Segment B
510Cn PHT Allocation Register n Segment C
510Dn PHT Allocation Register n Segment D
515 Request Thread ID (TID)
517 Response Thread ID (TID)
520 X Signal
525 MUX Select Line X=A & B
530 Y Signal
535 MUX Select Line Y=C & D
540 Z Signal
545 MUX Select Line Z={(A & B & C & D), (B & C)}
600 Multi-Threaded GShare Branch Predictor Write Operation Example
605 E Signal
610 DEMUX Select Line E=A & B
615 F Signal
620 DEMUX Select Line F=C & D
625 G Signal
630 DEMUX Select Line G={(A & B & C & D), (B & C)}

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising a Pattern History Table (PHT) having a plurality of PHT entries, wherein the PHT is configured with a PHT allocation multiplexer/demultiplexer (PAMD) configurable to provide a predicted address output logically selected from a portion of the plurality of PHT entries selectively allocated among a plurality of threads;
and where the PHT entries are organized as PHT segments on a per-thread basis, and where certain threads have particular branch instructions which are identified as one of: critical, important, or non-priority;
and where certain of the PHT segments are dynamically allocated using control bits from a Control and Status Register (CSR) such that the particular branch instructions identified as critical branch instructions receive a greater number of PHT entries in an associated PHT segment than branch instructions of a thread identified as having important or non-priority branch instructions.

2. The apparatus of claim 1, wherein the PAMD further comprises a plurality of PAMD modules, wherein each PAMD module of the plurality of PAMD modules is configured with at least one input, at least one output, and at least one select input configured to govern the at least one output determined as a function of the at least one input.

3. The apparatus of claim 2, wherein the plurality of PAMD modules further comprises at least one multiplexer.

4. The apparatus of claim 2, wherein the plurality of PAMD modules further comprises at least one demultiplexer.

5. The apparatus of claim 2, wherein at least one select input of at least one of the plurality of PAMD modules is configured to be governed by at least one configurable control bit.

6. The apparatus of claim 5, wherein the Control and Status Register (CSR) has a plurality of control bits configured to govern per-thread allocation of PHT entries based on at least one logical function of at least one of the plurality of control bits.

7. The apparatus of claim 1, wherein each PHT entry further comprises a two-bit saturating counter.

8. The apparatus of claim 1, wherein the apparatus further comprises a GShare branch predictor.

9. The apparatus of claim 1, wherein the predicted address output is provided as an input to a fetch stage of a pipelined processor.

10. An apparatus configured to provide a branch target address for a plurality of independent threads in a single pipeline processor having a series of pipeline stages executing the plurality of independent threads in a sequence determined by a thread scheduler, certain of the threads having greater relative branch intensiveness than other threads, the apparatus comprising:
  a Branch Target Buffer (BTB) having a plurality of BTB entries, an index input, and an address output, wherein the BTB is configured to provide on the address output a target address indexed in the BTB based on an address received from a per-thread Program Counter (PC) on the index input;
  a Pattern History Table (PHT) comprising a PHT read index input, a plurality of PHT entries wherein each PHT entry of the plurality of PHT entries comprises a saturating binary counter, and a branch prediction output, wherein the PHT is configured to provide on the branch prediction output an indication of a taken or not taken prediction by a saturating binary counter PHT entry indexed based on a per-thread Global Branch History Register (GBHR) operably coupled with the PHT read index input; and
  a PHT allocation multiplexer/demultiplexer (PAMD) comprising a plurality of PAMD modules operably coupled with the PHT, wherein each PAMD module of the plurality of PAMD modules has at least one select input governing at least one PAMD module output determined as a logical function of at least one of a plurality of control bits configurable to output a predicted address logically selected from a portion of the plurality of PHT entries selectively allocated among the plurality of threads;
  and where the PHT is organized as per-thread PHT segments, a greater number of the PHT segments being assigned to branches of the certain threads having greater relative branch intensiveness than threads with comparatively less branch intensiveness.

11. The apparatus of claim 10, wherein each saturating binary counter is an n-bit counter.

12. The apparatus of claim 10, wherein the plurality of PHT segments is reduced in number when the branch intensiveness decreases for an associated thread.

13. The apparatus of claim 12, wherein the plurality of PAMD modules are configured to logically concatenate a portion of the plurality of PHT segments.

14. The apparatus of claim 12, wherein each PHT segment of the plurality of PHT segments has two hundred fifty-six entries.

15. The apparatus of claim 10, wherein the PHT further comprises a PHT write index input supplied with an address determined as a function of a branch outcome from an execution stage of a pipelined processor.

16. The apparatus of claim 10, wherein the PHT further comprises a predicted branch outcome operably coupled with a pipelined processor.

17. An apparatus comprising:
  a Branch Target Buffer (BTB) having a plurality of BTB entries, an index input, and an address output, wherein the BTB is configured to provide on the address output a target address indexed in the BTB based on an address received from a per-thread Program Counter (PC) on the index input;
  a Pattern History Table (PHT) configured with a plurality of PHT segments each comprising a plurality of PHT entries, the PHT segments assigned by a control and status register (CSR), wherein each PHT entry of the plurality of PHT entries comprises two hundred fifty-six saturating two-bit counters, a PHT read index input, a PHT write index input supplied with an address determined as a function of a branch outcome from an execution stage of a pipelined processor, the pipelined processor executing a plurality of threads in a sequence determined by a thread scheduling register, the pattern history table providing a branch prediction output, wherein the PHT is configured to provide on the branch prediction output an indication of a taken or not taken prediction by a saturating binary counter PHT entry indexed based on per-thread Global Branch History Register (GBHR) operably coupled with the per-thread Program Counter (PC); and
  a PHT allocation multiplexer/demultiplexer (PAMD) comprising a plurality of PAMD modules operably coupled with the PHT, wherein each PAMD module of the plurality of PAMD modules has at least one select input governing at least one PAMD module output determined as a logical function of at least one of a plurality of control bits configurable to provide a predicted address output logically selected from a portion of the plurality of PHT segments selectively allocated among a plurality of threads, and wherein the predicted address output is operably coupled with a fetch stage of the pipelined processor;
  whereby when a particular thread of the plurality of threads has a branch misprediction rate which increases above a threshold, the CSR assigns additional PHT segments to the particular thread.

18. The apparatus of claim 17, wherein the plurality of threads is at least four threads.

19. The apparatus of claim 17, wherein the plurality of control bits further comprise two bits controlling PHT segment allocation to each thread.

20. The apparatus of claim 17, wherein a number of the plurality of threads is not greater than the number of the plurality of PHT segments.

* * * * *